M. A. FURBUSH.
Spindle-Whirls for Spinning-Machines.
No. 146,059. Patented Dec. 30, 1873.
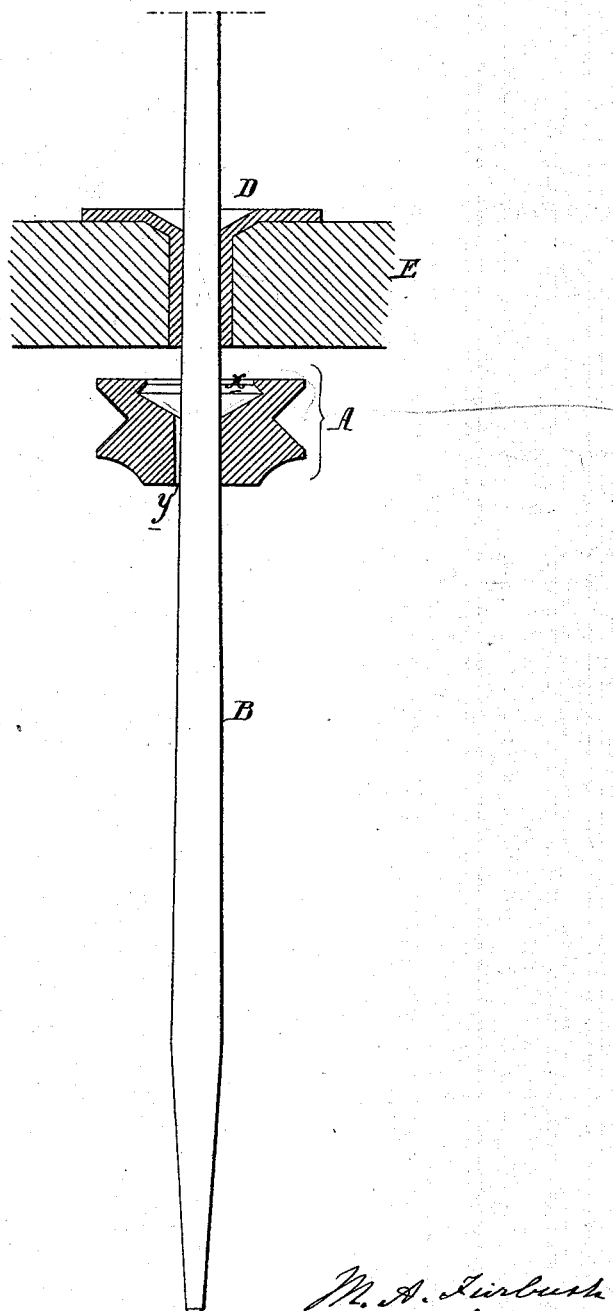
WITNESSES

UNITED STATES PATENT OFFICE.

MERRILL A. FURBUSH, OF PHILADELPHIA, PENNSYLVANIA, ASSIGNOR TO HIMSELF AND CHARLES A. FURBUSH, OF SAME PLACE.

IMPROVEMENT IN SPINDLE-WHIRLS FOR SPINNING-MACHINES.

Specification forming part of Letters Patent No. 146,059, dated December 30, 1873; application filed November 8, 1872.

*To all whom it may concern:*

Be it known that I, MERRILL A. FURBUSH, of Philadelphia, Pennsylvania, have invented an Improvement in Pulleys for Spinning-Machines, of which the following is a specification:

The object of my invention is to prevent the oil used in lubricating the spindles of spinning-machines from being thrown by centrifugal force outward from the exposed or uncovered grooved pulley upon the driving-band, to the injury of the latter; and this object I attain by forming in the top of the grooved pulley A, attached to the spindle B, a chambered or undercut recess, $x$, for receiving the oil from the bearing above, the oil passing from this recess through a channel, $y$, formed in the pulley adjacent to the spindle, all as shown in the accompanying drawing, in which—

B represents one of the spindles of an ordinary spinning-mule; D, the upper bearing of the spindle, fitted to the rail E, the lower end of the spindle revolving in the usual step.

The driving-cords of spindles are soon rotted and rendered useless by the oil, which, passing from the upper bearing onto the usual flat top of the rapidly-revolving pulley, is thrown out from the latter by centrifugal action onto the said cords. This I obviate by making the above-mentioned recess $x$ in the top of the pulley, the recess being chambered laterally, so that the oil which it receives cannot be disseminated by centrifugal action.

During the repeated stoppages of the spindle, (for the motion of the spindles of all spinning-machines is discontinued from time to time,) the oil which has gained access to the chamber can pass therefrom through the above-mentioned channel $y$, when it can flow down the spindle to the lower bearing.

By forming the recess in the pulley, instead of by means of a flange on the latter, as heretofore, the weight and cost of the pulley are reduced and its manufacture facilitated, while by undercutting the recess the necessity of employing an independent drip-cup upon the spindle above the pulley is obviated.

I claim—

The combination, with a spinning-machine spindle, of a pulley having an undercut recess and channel, as set forth.

In testimony whereof I have signed my name to this specification in the presence of two subscribing witnesses.

M. A. FURBUSH.

Witnesses:
WM. A. STEEL,
HUBERT HOWSON.